United States Patent [19]

Kuhn et al.

[11] Patent Number: 5,136,910
[45] Date of Patent: Aug. 11, 1992

[54] METHOD AND APPARATUS FOR CUTTING A WORK PIECE HAVING A SURFACE COATING

[75] Inventors: Reiner Kuhn, Nuertingen; Michael Weingart, Kirchheim, both of Fed. Rep. of Germany

[73] Assignee: Karl M. Reich Maschinenfabrik GmbH, Nuertingen, Fed. Rep. of Germany

[21] Appl. No.: 641,492

[22] Filed: Jan. 15, 1991

[30] Foreign Application Priority Data

Jan. 18, 1990 [DE] Fed. Rep. of Germany ....... 4001331

[51] Int. Cl.⁵ ............................ B26D 3/08; B27B 9/02
[52] U.S. Cl. ......................................... 83/863; 83/880; 83/881; 83/486; 83/489; 30/375; 30/377; 30/390; 144/3 R; 144/136 R; 144/368
[58] Field of Search ................. 83/862, 863, 879, 880, 83/881, 886, 887, 485, 486, 489; 144/312, 136 R, 368; 30/374, 375, 377, 164.95, 388–391

[56] References Cited

U.S. PATENT DOCUMENTS

| | | | |
|---|---|---|---|
| 3,298,407 | 1/1967 | Scott | 83/489 |
| 4,058,150 | 1/1977 | Pennington | 83/862 X |
| 4,174,745 | 11/1979 | Benuzzi | 144/3 R X |
| 4,176,572 | 12/1979 | Pennington | 83/862 |
| 4,245,390 | 1/1981 | Bond | 83/863 X |
| 4,308,777 | 1/1982 | Lawson | 83/863 X |
| 4,353,165 | 10/1982 | Albery | 30/376 |
| 4,756,218 | 7/1988 | Benuzzi | 144/3 R X |
| 4,856,394 | 8/1989 | Clowers | 30/377 X |
| 4,970,927 | 11/1990 | Benuzzi | 83/875 |

FOREIGN PATENT DOCUMENTS 3800935 7/1989 Fed. Rep. of Germany .

*Primary Examiner*—Frank T. Yost
*Assistant Examiner*—Eugenia A. Jones
*Attorney, Agent, or Firm*—W. G. Fasse

[57] ABSTRACT

Flat multi-layered work pieces, such as panels with a decorative or finish surface coating (5), are prescored and cut through by the same saw blade to avoid damage to the surface coating. For this purpose a circular saw (1) is guided along a guide rail (7) and its saw blade (4) is adjustable to a prescoring depth and to at least one lateral prescoring position to make a first prescoring cut only through the cover layer (5) in a sawing direction in synchronism with the blade rotation direction. If necessary, the blade is adjusted to a second lateral prescoring position to make a second prescoring cut only through the cover layer (5) in a cutting direction in synchronism with the blade rotation. Finally, the saw blade (4) is adjusted to its full cutting depth and to a lateral position between the two prescoring positions and a full cut is made through the entire work piece (6) in a sawing direction counter to the rotation direction of the saw blade. A circular saw for carrying out the foregoing method has a single saw blade, stop elements, and adjustment mechanism for adjusting the single saw blade into the various necessary positions. The prescoring avoids damage to the surface coating even if it is brittle.

17 Claims, 4 Drawing Sheets

METHOD AND APPARATUS FOR CUTTING A WORK PIECE HAVING A SURFACE COATING

FIELD OF THE INVENTION

The invention relates to a method of cutting a work piece having a surface coating, such as a panel work piece, e.g. of plywood or the like, with a plastic laminate surface coating. The invention further relates to an apparatus for carrying out the method. Such an apparatus is embodied, for example in the form of a handheld circular saw.

BACKGROUND INFORMATION

Cutting panels, especially panels having a decorative coating layer on one side, such as wall paneling, by means of a circular handsaw, involves the problem that the cut edge can look frayed on the "good" side of the panel. Thus, cutting may have to be done on the backside of the panel, which is inconvenient because the lines to be cut must be drawn on the back of the panel as a "negative" so that the correct cut appears on the front or "good" side of the panel. This problem is especially pronounced where the surface coating is hard and brittle.

To avoid the above problem, German Patent Publication (DE-OS) 3,800,935 describes a method of cutting panel work pieces made of wood or the like, such as plywood or chip-board panels having a cover layer or coating of plastic or hard paper, by means of a handheld circular saw which has, in addition to the normal saw blade, a special prescoring saw blade for first scoring or cutting only the cover layer in a saw moving direction which is "synchronous", so to speak, with the rotation direction of the saw blade. Then, the regular cutting saw blade is used to completely cut through the work piece in a direction opposite to that of the saw blade rotation. In this manner it is prevented that the brittle cover layer is torn or splintered by the main cutting saw blade during its cutting operation in a counter-running direction. As mentioned, the known saw needs a scoring blade in addition to the normal cutting blade, whereby the structural supporting and drive for the separate scoring blade makes the handheld circular saw more troublesome, heavier, and more expensive.

In order to achieve satisfactory straight saw cuts in a simple manner it is generally known in the art to set the handheld circular saw onto a guide edge which has been positioned on the work piece, whereby a groove in the base plate of the circular saw cooperates with or slidingly engages a rib of the guide edge.

OBJECTS OF THE INVENTION

In view of the above it is the aim of the invention to achieve the following objects singly or in combination:

to provide an improved method for cutting coated or layered work pieces without damaging the surface cover layers of the work piece to avoid the above mentioned fraying;

to cut a coated or multi-layered work piece by first scoring or cutting the surface coating layer in a sawing direction in synchronism with the blade rotation direction, and then cutting through the full thickness of the work piece in a sawing direction counter to the saw blade rotation direction, whereby the same blade is used for both operations;

to allow a simple adjustment of the saw blade cutting depth in a handheld circular saw for selecting an adjustable shallow, scoring depth on the one hand, and alternatively to select an adjustable full cutting depth;

to provide a method as described above, that can be used for right-angle cuts and for miter cuts;

to construct an apparatus for carrying out the described method, especially by means of a handheld circular saw which is of relatively low cost and durable, simple, lightweight construction;

to construct such a circular saw to carry out the described method with a single saw blade so that separate cutting and scoring blades are not required;

to construct a handheld circular saw to be effectively guided along a guide edge for cutting straight line cuts; and to provide for a small lateral adjustment of the saw blade perpendicularly to the guide edge for easily locating the surface scoring line and the full depth cutting line at their respective appropriate locations.

SUMMARY OF THE INVENTION

The above objects have been achieved by a method for cutting coated or multi-layered pieces according to the invention, wherein the saw blade is first adjusted to a shallow scoring depth and the blade position is laterally adjusted to make a first scoring cut in a direction in synchronism with the blade rotation direction, and then, if necessary to obtain two neat cut edges in the surface coating, adjusting the lateral position of the blade to a second scoring position laterally next to the first scoring cut, and carrying out a second scoring cut in a sawing direction in synchronism with the blade rotation direction, and finally adjusting the saw blade to a full cutting depth and adjusting the lateral blade position to a position between the first and second scoring positions and carrying out a full depth cut through the full thickness of the work piece in a sawing direction counter to or opposite to the blade rotation direction.

The above objects have further been achieved in an apparatus according to the invention, wherein a circular saw, especially a handheld saw, has a base plate to which is attached a console to which a guide shoe with its guide groove is connected to be relatively slideable in a direction perpendicular to the plane of the saw blade. More specifically, the console and guide shoe are connected to each other by a threaded bolt under constant spring tension urging them apart.

Thus, when the method of the invention is carried out by the circular saw apparatus according to the invention, the scoring and the through cutting is made by the same blade, so that an additional prescoring saw blade with its own drive and support is not needed. This new operation is achieved because the saw blade is moved into the desired scoring positions by means of a simple sliding adjustment mechanism, so that after the prescoring cut or cuts have been made through the surface coating layer, the final full depth cut is made in a counter direction without damaging the brittle surface coating layer.

The adjustment of the prescoring depth is achieved by means of a scoring depth stop which assures a reliable operation and which prevents the saw blade from contacting the work piece to a full cutting depth during the prescoring cut in a direction in synchronism with the saw blade rotation direction. In order to carry out a full depth cut, this prescoring depth stop must be manually released by the operator, so that the full blade cutting depth may be adjusted. It is a further advantage of the scoring depth stop, that the scoring depth may be adjusted as necessary to account for various thicknesses of cover layers on different work pieces, or for exchanging saw blades, or for regrinding saw blades which have become worn.

If a work piece is merely to be trimmed, then the edge trim portion and its cover layer are merely scrap. Hence, it is not necessary to carry out a prescoring cut on the waste side of the final full depth cut. Such trimming or edging is the most common use for the described handheld circular saw, so that the operating procedure is usually considerably quickened because only a single scoring cut and then a single full depth cut need be made.

When carrying out angular or miter cuts with the saw according to the invention, the saw blade swings or tilts in a direction toward the guide rail edge, so that it is necessary to shift the handheld circular saw in a direction crosswise to the guide rail edge. Such an adjustment is possible according to the invention so that the present circular saw may be used for prescoring and for carrying out angular or miter cuts also with prescoring.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
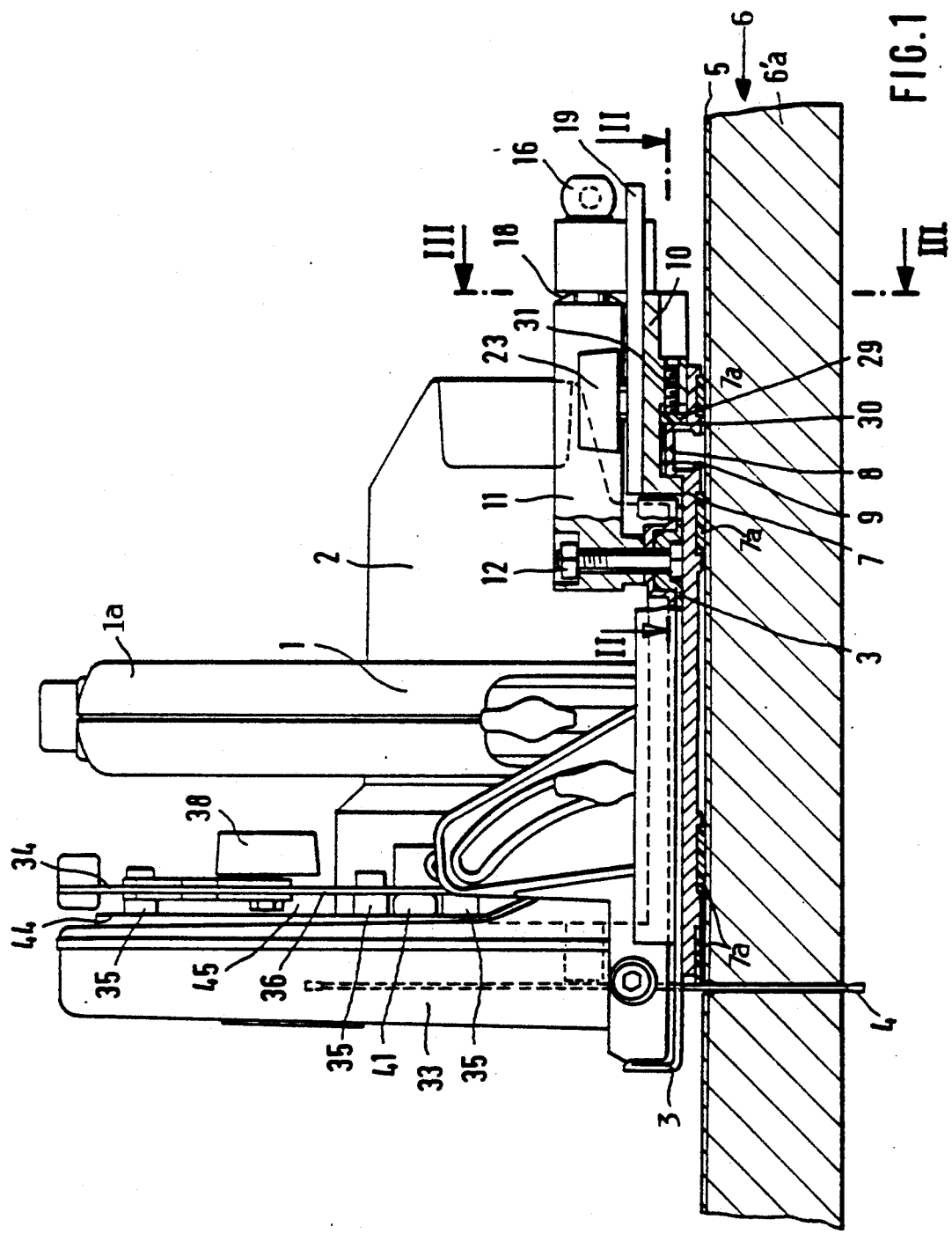
FIG. 1 is a front view of a handheld circular saw according to the invention in partial section along line I—I of FIG. 2.

FIG. 1 is a front view of a handheld circular saw 1 which is, for example, a so-called plunge saw having a motor housing 2 tiltably mounted on a base plate 3, whereby the tilting allows an adjustment of the cutting depth of the saw blade 4. The saw blade 4 in the saw according to the invention serves both for prescoring a cover layer 5 of a work piece, such as a panel 6 and for cutting through the entire thickness of a substrate 6' of the work piece 6. For example, the substrate 6' may be a wooden panel or plywood sheet and the cover layer 5 is a plastic laminate bonded to the substrate 6' to form the panel 6 with a decorative or finish coating.

In order to guide the saw 1 for making straight cuts, a guide edge 7 may be placed on the surface of the panel 6 in an appropriate priate position. The downwardly facing side of the guide edge 7 has friction pads 7a or the like for securely holding the guide edge 7 on the surface of the panel. The saw 1 has a guide groove 9 which engages a guide rib 8 of the guide edge 7 to slide along the guide edge 7. Specifically, a guide shoe 10 connected to the base plate 3 of the saw is provided with the groove 9.

Figure 2:
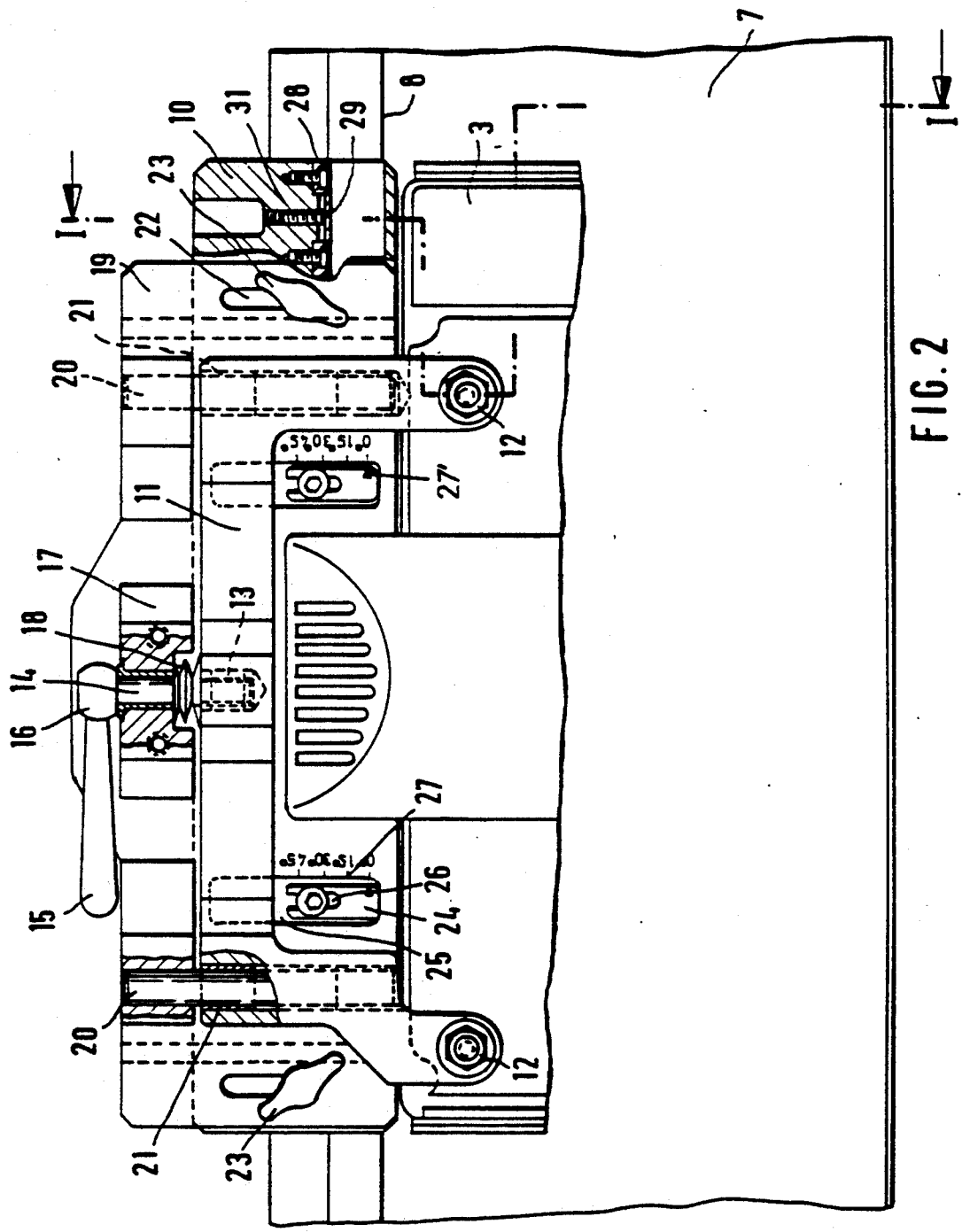
FIG. 2 is a partial top view of the saw of FIG. 1, showing a console and guide shoe in partial section along line II—II of FIG. 1.

As shown in the detail view of FIG. 2, a console 11 holds the guide shoe 10. The console 11 is removably secured to the base plate 3 by screws 12. The console 11 includes a threaded bore 13 into which a threaded bolt 14 is screwed to engage the threaded hole 13 in the console 11. The outer end of the threaded bolt 14 ends in a lug received in an eye 16 and a lever 15 extending therefrom. The bolt 14 passes through a block 17 connected to the guide shoe 10 and through a stack of disk springs or Belleville springs 18 arranged between the block 17 and the console 11, whereby the disk springs 18 constantly urge the block 17 and the console 11 apart from each other so as to urge the block 17 against the eye 16 of the bolt 14.

An adjustment plate 19 is arranged between the guide shoe 10 and the console 11 and carries the block 17 attached to the adjustment plate 19. Two guide bolts 20 are connected to the adjustment plate 19 and are slidingly inserted in guide bores 21 of the console 11. In this manner, the guide shoe 10 is slideably supported on the base plate 3 and may be slidingly adjusted in a direction perpendicular to the saw blade 4 by turning the bolt 14 by means of its operating lever 15. The adjustment plate 19 further comprises preferably two slots 22 elongated in a direction perpendicular to the saw blade 4. Screws 23, which are screwed into or connected to the guide shoe 10, pass through the slots 22 and adjustably engage the adjustment plate 19. The guide shoe 10 is further provided with stop members 24 which are positioned within cutout grooves or recesses 25 of the adjustment plate 19. The stop members have elongated holes 26. An angle scale 27 is marked on the adjustment plate 19 along the edge of each groove 25 to cooperate with an angle pointer mark 27' marked onto each stop member 24 for indicating the position of the stop to thereby function as an angle indicator for miter cuts.

In order to prevent too much play between the guide rail edge 7 and the guide shoe 10, an insert 28 made of an elastic, synthetic plastic material is arranged in a cutout of the guide shoe 10 in such a manner that a thin wall portion 29 of the insert 28 forms a part of the side wall 30 of the guide shoe 10. Thus, as shown in FIGS. 1 and 2, the guide rib 8 of the guide rail edge 7 is slidingly engaged by the side wall 30 of the guide shoe 10, whereby the side wall 30 is at least partially formed by the plastic insert 28. An adjustment screw 31 is arranged in the guide shoe 10 so that its end acts on the thin wall region 29 of the plastic insert 28, whereby the wall portion 29 of the insert 28 may be adjusted as desired in a direction toward or away from the guide rib 8 to virtually completely eliminate any play between the guide rib 8 and the plastic insert 28 forming the side wall 30 of the guide shoe 10.

Figure 3:
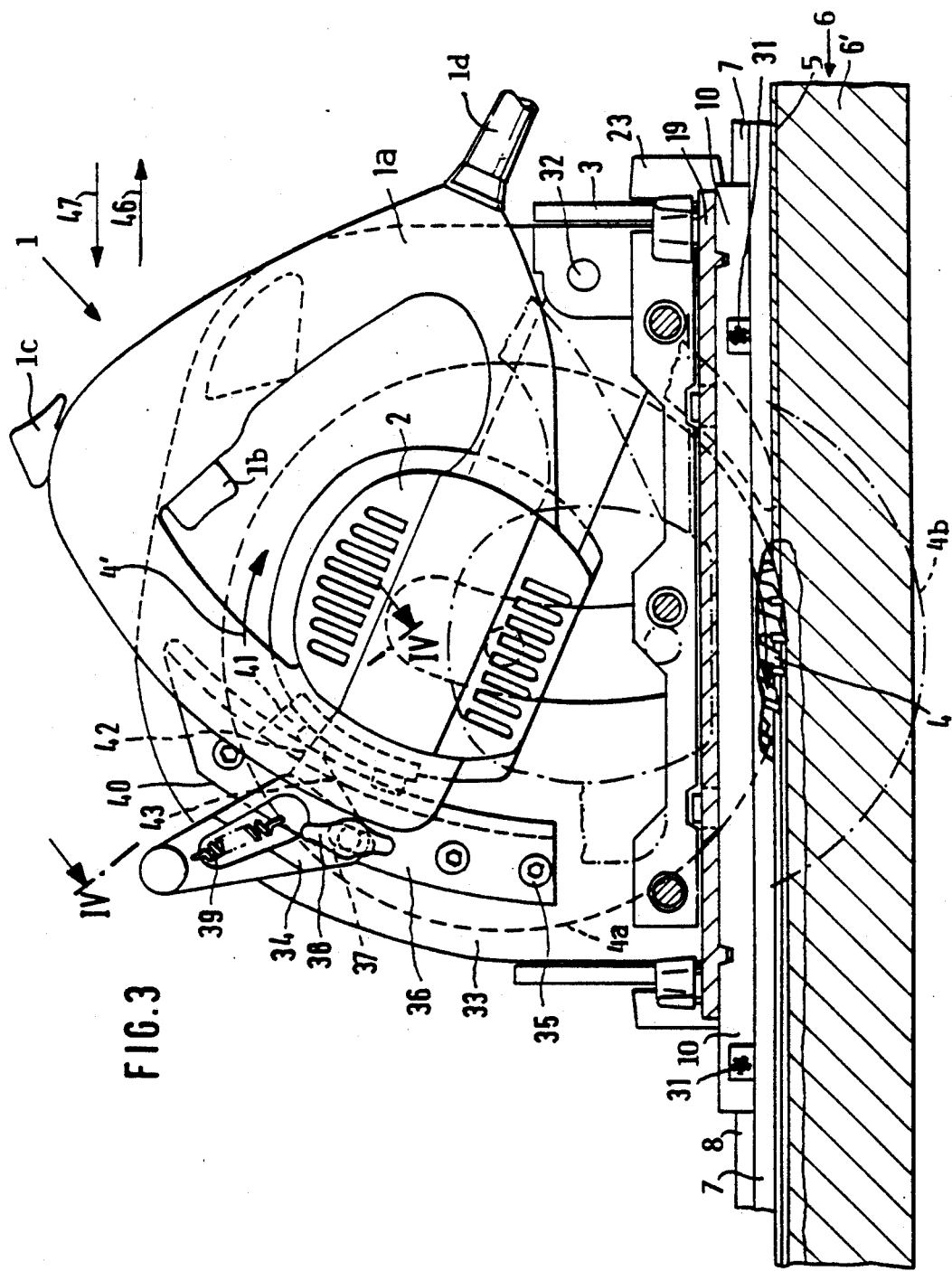
FIG. 3 is a side view from the motor side of the circular saw according to FIG. 1, in partial section along line III—III of FIG. 1.

FIG. 3 shows the motor side view of the plunge saw or handheld circular saw 1 according to the invention, whereby a handle 1a is connected to the motor housing 2. A conventional trigger switch 1b is provided on the inside of the handle 1a while a thumb switch 1c is provided on the outside of the handle for locking the trigger switch 1b in an operating position, if desired. A power cable 1d leads into the handle 1a. The just described elements 1, 2 including the saw blade 4 are tiltably connected to the base plate 3 by a tilting axle 32 so as to be tiltable about the axis of the axle 32. The blade 4 can assume several positions which are adjustable as will be described in more detail below. For example, position 4a is a scoring position while position 4b is a through cutting position of the blade 4.

A protective blade guard 33 is rigidly connected to the base plate 3 to surround the saw blade 4 in all of its tilted positions. A prescoring stop in the form of a tilt lever 34 is tiltably connected to the blade guard 33 in order to allow the saw blade 4 to be adjusted to the desired prescoring depth 4a by tilting the motor housing about the tilting axle 32.

Figure 4:
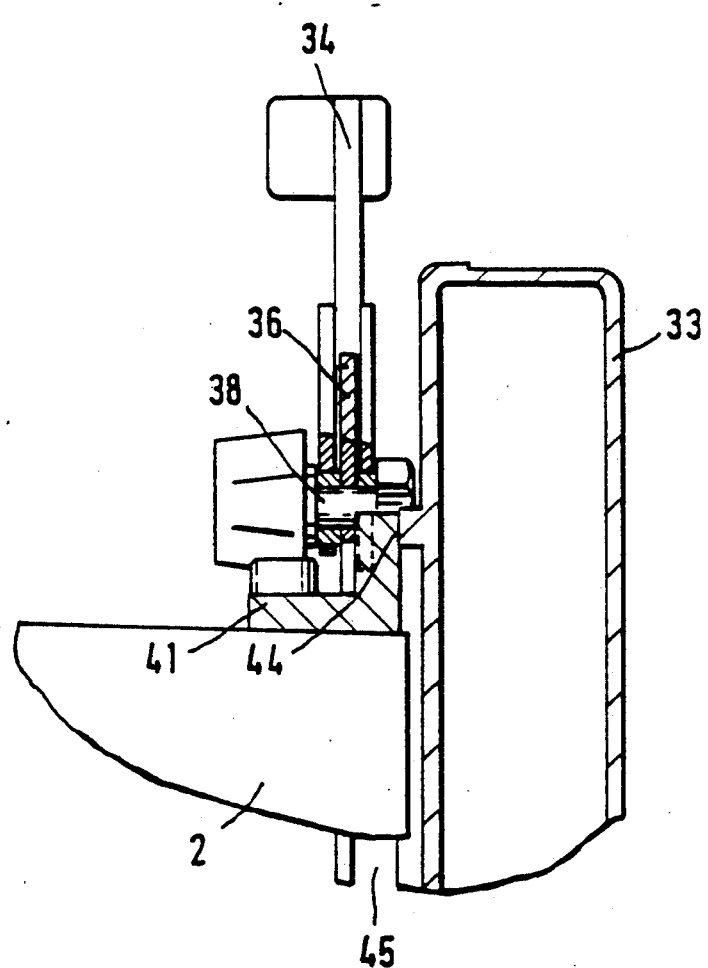
FIG. 4 is a top view of a prescoring stop, partially in section along line IV—IV of FIG. 3.

As is further shown in FIG. 4 in conjunction with FIG. 3, a guide plate 36 comprising an elongated hole 37, is connected to the blade guard 33, for example, by screws extending into holes 35 in the blade guard 33. The tilt lever 34 is adjustably supported by an adjustment screw 38 in the elongated hole 37 so as to be tiltable and adjustable in a substantially vertical direction. The tilt lever 34 is urged in a direction toward the motor housing 2, by a tension spring 39 attached to the guide plate 36 until the lever 34 comes to rest against a surface 40 forming a stop element on the guide plate 36. A further stop element 41 is connected to the motor housing 2 in a position so that the stop element 41 contacts a stop nose 42 of the tilt lever 34 when the saw blade 4 is in its prescoring position 4a as shown especially in FIG. 3 by a dashed line circle.

In order to carry out the final cut through the entire thickness of the work piece or panel 6, the tilt lever 34 is pushed in a counterclockwise direction so that the stop nose 42 releases the stop element 41 and so that the motor housing 2 may be tilted into the desired full plunge cutting depth position 4b shown by a dash-dotted line circle in FIG. 3, by tilting about axle 32. Tilt lever 34 further comprises a slanted run-up surface 43 which cooperates with or contacts the stop element 41 during the return tilting of the motor housing 2 for moving the tilt lever 34 outwardly so that the stop element 41 can again pass over the stop nose 42.

As shown in FIG. 4, the blade guard 33 is provided with a guide surface 44 which forms with the guide plate 36 a guide slot 45. A stop element 41 reaches into and slidingly engages the guide slot 45 in such a manner that the motor housing 2 and thus the saw blade 4 is reliably guided during the cutting movement.

In order to carry out the method according to the invention, the present handheld circular saw 1 is first shifted transversely to the base plate 3 approximately 0.6 mm by pushing the lever 15 into the position shown in FIG. 2. Then, the motor housing 2 is tilted from its resting position in a counterclockwise direction until stop element 41 contacts stop nose 42 as shown in FIG. 3. In this position 4a the saw blade 4 protrudes downwardly by about 3 mm beyond the guide rail 7. In this position of the saw blade 4, the circular saw 1 is pulled along the guide rail 7 in the direction of the arrow 46 shown in FIG. 3, so that the cover layer or coating 5 of the work piece or panel 6 is prescored in the same direction as the rotation direction 4' of the saw blade 4. Then, by turning lever 15 by 180°, the circular saw 1 is shifted transversely to the base plate 3 into a second lateral prescoring position in which the saw 1 is again moved along the guide rail 7 in a synchronous cutting direction shown by arrow 46 to prescore the cover layer or coating 5 along a line parallel to and adjacent to the first prescoring line. In this manner, a groove has been formed in the cover layer 5 which is wider than the blade thickness of saw blade 4 by a maximum of 0.3 mm on each side of the saw blade 4, thereby providing the clearance required for avoiding marring the finish surface of the coating 5.

Finally, lever 15 is turned into a vertical position so that the circular saw 1 is moved laterally into a centered position between the first and second prescoring positions. Then, the prescoring stop 34 is manually tilted in a counterclockwise direction, whereby the motor housing 2 and the saw blade 4 are also tilted about the tilting axle 32, shown in FIG. 3, in a counterclockwise direction, for example, against a maximum cutting depth stop which is not shown, to place the blade and the saw into the dash-dotted position 4b so that the final full depth cut can be made through the work piece or panel 6 in a counter cutting direction shown by arrow 47.

As shown in FIG. 3, the blade rotation direction at the down side of the saw blade 4 is directed against or counter to the advance direction 46 of the saw during scoring cut. However, at the upper blade side the blade rotation direction is directed in the same direction as the saw advance direction 46. The same considerations apply to the arrow 47 representing the full cut moving direction of the saw.

Although the invention has been described with reference to specific example embodiments, it will be appreciated that it is intended to cover all modifications and equivalents within the scope of the appended claims.

What we claim is:

1. A method for cutting with a circular power handsaw engaging first guide means, a coated work piece having at least a substrate and a cover coating, comprising the following steps:
   (a) first adjusting a saw blade to a scoring depth, whereby a scoring cut depth is limited to said scoring depth,
   (b) scoring said cover coating along a first scoring line to said scoring depth in a first scoring pass of said saw blade moving in a scoring direction which is the same as a rotation direction of said saw blade as viewed at an upper edge of said saw blade;
   (c) moving said saw along second guide means laterally to a cutting line parallel to said first scoring line so that a subsequent through-cut has a clearance from said first scoring line;
   (d) second adjusting said saw blade to a through-cut depth; and
   (e) cutting through a full thickness of said work piece along said cutting line in a cutting pass of said saw blade moving in a cutting direction opposite said scoring direction and counter to said rotation direction of said saw blade also as viewed at an upper edge of said saw blade.

2. The method of claim 1, further comprising:
   (a) after said first scoring pass, adjusting said saw blade laterally to a second scoring line parallel to said first scoring line and parallel to said cutting line extending intermediate said first and second scoring lines;
   (b) maintaining said scoring depth;
   (c) scoring only through said cover coating along said second scoring line in a second scoring pass of said saw blade moving in said scoring direction;
   (d) before said full thickness cutting, adjusting said saw blade laterally to said cutting line parallel to and between said first and second scoring lines;
   (e) then performing said adjusting of said saw blade to said through-cut depth; and
   (f) performing said full thickness cutting.

3. The method of claim 1,
   (a) wherein said scoring cut depth of said saw blade corresponds at least to a thickness of said cover coating; and wherein
   (b) said through-cut depth of said saw blade corresponds at least to a total thickness of said work piece.

4. A circular power handsaw for cutting coated work pieces having at least a substrate and a cover coating, comprising a base plate, a console operatively secured to said base plate, a guide shoe having a guide groove for engaging a guide rail, saw blade drive means mounted on said guide shoe, first adjustment means for adjustably mounting said guide shoe to said console for adjustably displacing said saw blade drive means laterally in a direction perpendicularly to a plane defined by a saw blade, whereby said saw blade is positionable at least on one scoring line extending in parallel to a final through-cutting line with a clearance sufficient to space a blade edge in its through-cutting position from said scoring line, and second adjustment means for adjusting a first scoring cut depth prior to a scoring cut and for adjusting a through-cut depth for performing a through-cut following a scoring cut, whereby blade angling for a scoring cut is avoided.

5. The circular saw of claim 4, wherein said first adjustment means permit a lateral displacement of said saw blade first to one scoring line in parallel to and along one side of said final through-cutting line and then to another scoring line in parallel to said final through-cutting line along an opposite side of said final through-cutting line, and wherein said second adjustment means limit a protrusion of said saw blade through said base plate.

6. The circular saw of claim 4, wherein said first adjustment means are provided between said console and said guide shoe.

7. The circular saw of claim 6, wherein said first adjustment means comprise a threaded bolt and a threaded nut rigidly secured to said console, said threaded bolt engaging said threaded nut.

8. The circular saw of claim 4, wherein said first adjustment means further comprise spring means operatively interposed between said console and said guide shoe for biasing said console and guide shoe away from each other.

9. The circular saw of claim 4, wherein said first adjustment means comprise an adjustment plate arranged between said console and said guide shoe, said adjustment plate being displaceable perpendicularly to said saw blade, and an adjustment member for displacing said adjustment plate relative to said base plate, wherein said guide shoe is adjustably mounted on said adjustment plate, and means for securing said guide shoe in a fixed position on said adjustment plate after said guide shoe has been adjusted in a direction perpendicularly to said saw blade.

10. The circular saw of claim 9, further comprising stop means connected to said guide shoe, and angular position indicator means as part of said stop means for indicating an angular position of said adjustment plate, whereby a cutting depth of said saw blade is indicated by said angular position indicator means.

11. The circular saw of claim 4, wherein said guide groove of said guide shoe has at least one side wall with a recess in said one side wall forming said guide groove, said saw further comprising an adjustable screw in said guide shoe reaching into said recess for influencing a play between said guide shoe and said guide rail.

12. The circular saw of claim 4, further comprising at least one insert of elastic, synthetic material in said guide groove of said guide shoe along at least one side wall of said guide groove, said saw further comprising an adjustable screw in said guide shoe, said insert having a recess therein positioned for cooperation with one end of said adjustable screw in said guide shoe for adjusting a play between said guide shoe and said guide rail.

13. The circular saw of claim 4, further comprising a blade guard rigidly connected to said base plate, said second adjustment means including first stop means secured to said blade guard, said saw blade drive means including a motor housing, a second stop means secured to said motor housing in a position for cooperation with said first stop means when said saw blade is in a scoring depth position.

14. The circular saw of claim 13, wherein said first stop means are adjustably secured to said blade guard for an adjustment toward and away from said base plate.

15. The circular saw of claim 14, wherein said first stop means comprise a tiltable lever having a stop surface facing toward said second stop means for cooperation with said second stop means secured to said motor housing.

16. The circular saw of claim 13, wherein said blade guard has a guide slot, said second stop means connected to said motor housing, reaching into said guide slot of said blade guard.

17. A circular saw for cutting coated work pieces having at least a substrate and a cover coating, comprising a base plate, a console operatively secured to said base plate, a guide shoe having a guide groove for engaging a guide rail, saw blade drive means mounted on said guide shoe, and adjustment means for adjustably mounted said guide shoe to said console for adjustably displacing said saw blade drive means in a direction perpendicularly to a plane defined by a saw blade, whereby said saw blade is positionable at least on one scoring line extending in parallel to a final through-cutting line, said saw further comprising at least one insert of elastic, synthetic material in said guide groove of said guide shoe along at least one side wall of said guide groove, said saw further comprising an adjustable screw in said guide shoe, said insert having a recess therein positioned for cooperation with one end of said adjustable screw in said guide shoe for adjusting a play between said guide shoe and said guide rail.

* * * * *